(12) United States Patent
Wang et al.

(10) Patent No.: US 12,068,459 B2
(45) Date of Patent: Aug. 20, 2024

(54) FAILED BATTERY CELL HANDLING METHOD, BATTERY MODULE, BATTERY PACK, AND DEVICE

(71) Applicant: CONTEMPORARY AMPEREX TECHNOLOGY CO., LIMITED, Fujian (CN)

(72) Inventors: Peng Wang, Ningde (CN); Xingdi Chen, Ningde (CN); Mingdi Xie, Ningde (CN); Linggang Zhou, Ningde (CN); Zhanyu Sun, Ningde (CN); Kai Wu, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 392 days.

(21) Appl. No.: 17/489,116

(22) Filed: Sep. 29, 2021

(65) Prior Publication Data

US 2022/0021034 A1  Jan. 20, 2022

Related U.S. Application Data

(63) Continuation of application No. PCT/CN2020/131570, filed on Nov. 25, 2020.

(30) Foreign Application Priority Data

Nov. 29, 2019 (CN) .......................... 201911205560.X

(51) Int. Cl.
*H01M 10/42* (2006.01)
*B60L 50/64* (2019.01)
(Continued)

(52) U.S. Cl.
CPC ......... *H01M 10/4207* (2013.01); *B60L 50/64* (2019.02); *H01M 10/4235* (2013.01);
(Continued)

(58) Field of Classification Search
CPC ...................................................... B60L 50/64
See application file for complete search history.

(56) References Cited

U.S. PATENT DOCUMENTS 8,852,770 B2  10/2014 Langheim
9,123,978 B2   9/2015 Langheim
(Continued)

FOREIGN PATENT DOCUMENTS

CN   101017887 A    8/2007
CN   101567436 A   10/2009
(Continued)

OTHER PUBLICATIONS

Extended European Search Report dated Jun. 15, 2022 received in European Patent Application No. EP 20894425.6.
(Continued)

*Primary Examiner* — Gregg Cantelmo
(74) *Attorney, Agent, or Firm* — Scully, Scott, Murphy & Presser, P.C.

(57) ABSTRACT

A failed battery cell handling method, a battery module, a battery pack, and a device, which relates to the technical field of energy devices. The handling method includes: injecting a conductive material into a failed battery cell, where the conductive material is in a molten state when being injected, and is in a solid state after cooling, and the conductive material is configured to electrically connect a positive terminal and a negative terminal of the failed battery cell.

15 Claims, 7 Drawing Sheets

(51) Int. Cl.
  *H01M 10/48*      (2006.01)
  *H01M 10/653*     (2014.01)
  *H01M 50/103*     (2021.01)
  *H01M 50/119*     (2021.01)
  *H01M 50/209*     (2021.01)
  *H01M 50/249*     (2021.01)
  *H01M 50/291*     (2021.01)
  *H01M 50/543*     (2021.01)

(52) U.S. Cl.
  CPC ....... *H01M 10/482* (2013.01); *H01M 10/653* (2015.04); *H01M 50/103* (2021.01); *H01M 50/119* (2021.01); *H01M 50/209* (2021.01); *H01M 50/249* (2021.01); *H01M 50/291* (2021.01); *H01M 50/543* (2021.01); *H01M 2220/20* (2013.01)

(56) References Cited

U.S. PATENT DOCUMENTS

| | | | |
|---|---|---|---|
| 2012/0315518 A1 | 12/2012 | Langheim | |
| 2013/0071306 A1* | 3/2013 | Camp | A62D 3/32 |
| | | | 588/314 |
| 2014/0335383 A1 | 11/2014 | Langheim | |
| 2016/0308191 A1 | 10/2016 | Becker-Irvin et al. | |
| 2021/0083260 A1 | 3/2021 | Schmidt | |

FOREIGN PATENT DOCUMENTS

| | | |
|---|---|---|
| CN | 107431254 A | 12/2017 |
| CN | 107658411 A | 2/2018 |
| CN | 109473743 A | 3/2019 |
| DE | 102017222642 A1 | 6/2019 |
| EP | 3336933 A1 | 6/2018 |
| JP | H11204096 A | 7/1999 |
| JP | 2005166581 A | 6/2005 |
| JP | 2010205728 A | 9/2010 |
| JP | 2015056928 A | 3/2015 |
| JP | 2022522490 A | 4/2022 |

OTHER PUBLICATIONS

Decision to Grant a Patent dated Jul. 18, 2023 received in Japanese Patent Application No. JP 2022-531569.

* cited by examiner

| Injecting a conductive material into a failed battery cell, where the conductive material is in a molten state when being injected, and is in a solid state after cooling | — S1 | her
FAILED BATTERY CELL HANDLING METHOD, BATTERY MODULE, BATTERY PACK, AND DEVICE

CROSS-REFERENCE TO RELATED APPLICATIONS

This application is a continuation of International Application No. PCT/CN2020/131570, filed on Nov. 25, 2020, which claims priority to Chinese Patent Application No. 201911205560.X, filed on Nov. 29, 2019 and entitled "FAILED BATTERY CELL HANDLING METHOD, BATTERY MODULE, BATTERY PACK, AND DEVICE", which is incorporated herein by reference in its entirety.

TECHNICAL FIELD

This application relates to the technical field of energy storage devices, and in particular, to a failed battery cell handling method, a battery module, a battery pack, and a device.

BACKGROUND

A battery module includes a plurality of battery cells arranged sequentially, and the plurality of battery cells are electrically connected, so that the battery module outputs electric energy and supplies power to an electric device. The battery cells are at risk of faults during charge and discharge. When a battery cell is faulty, an entire circuit of the battery module is faulty, thereby making the battery module unable to work normally.

In related technologies, when a battery cell fails, the entire battery module is usually replaced as a solution. However, when a battery cell of the battery module fails, other battery cells still work normally. Directly replacing the entire battery module causes a waste of resources. In addition, it takes a long time to disassemble and assemble the battery module, which reduces working efficiency.

Therefore, a failed battery cell handling method, a battery module, a battery pack, and a device are urgently required now to solve the above problem.

SUMMARY

This application provides a failed battery cell handling method, a battery module, a battery pack, and a device to simplify a maintenance process of the battery module, reduce maintenance cost, and improve working efficiency (utilization rate) of the battery module.

According to a first aspect, an embodiment of this application provides a failed battery cell handling method, including the following step: injecting a conductive material into a failed battery cell, where the conductive material is in a molten state when being injected, and is in a solid state after cooling, and the conductive material is configured to electrically connect a positive terminal and a negative terminal of the failed battery cell.

In the failed battery cell handling method according to this application, the conductive material that is configured to electrically connect the positive terminal and the negative terminal is injected into the failed battery cell. The conductive material is in the molten state when being injected and is in the solid state after cooling, so that the failed battery cell is short-circuited and other battery cells still work normally, without a need to replace the entire battery module. This simplifies a maintenance process of the battery module, reduces maintenance cost, and improves working efficiency (utilization rate) of the battery module.

In a possible design, the handling method further includes following step: extracting an electrolytic solution from inside the failed battery cell outward.

By extracting out the electrolytic solution, this application ensures safety of the battery cell, and ensures strength of connection between the conductive material and an electrode assembly, so as to prevent a void from being generated in the conductive material due to evaporation of the electrolytic solution.

In a possible design, the failed battery cell and a non-failed battery cell are fixed in a lower box body by a pressure plate, and the handling method further includes the following steps: determining a position of the failed battery cell; and injecting, after the pressure plate is removed, the conductive material into the failed battery cell through a first through hole opened on the failed battery cell.

The foregoing method makes the failed battery cell short-circuited, so as to simplify the maintenance process of the battery module, reduce the maintenance cost, and improve the working efficiency (utilization rate) of the battery module.

In a possible design, the failed battery cell and a non-failed battery cell are fixed in a lower box body by a pressure plate, and the handling method further includes the following steps: opening third through holes at positions corresponding to the failed battery cell and the non-failed battery cell on the pressure plate; determining a position of the failed battery cell; and opening, on the failed battery cell, first through holes corresponding to the third through holes, and injecting the conductive material into the failed battery cell through the first through holes.

By opening the third through holes at the positions corresponding to failed battery cell and the non-failed battery cell on the pressure plate, this application implements short-circuiting of the failed battery cell without removing the pressure plate, thereby simplifying the maintenance process of the battery module.

In a possible design, the pressure plate overlays housings of the failed battery cell and the non-failed battery cell, and the handling method further includes the following steps: opening fourth through holes at positions corresponding to the failed battery cell and the non-failed battery cell on the pressure plate; and opening, on the housing, second through holes corresponding to the fourth through holes.

With the fourth through holes being opened, the second through holes are opened on the housing of the failed battery cell at the determined position, and the electrolyte vapor in the housing is expelled through the second through hole. This can prevent the electrolytic solution from leaking through the first through hole, thereby avoiding the failure of other battery cells and even occurrence of a fire of the vehicle.

According to a second aspect, an embodiment of this application provides a battery module. The battery module adopts the failed battery cell handling method described above. The battery module includes a battery cell. A plurality of battery cells are arranged sequentially in a length direction. The battery cells include the failed battery cell. The failed battery cell includes: a housing, where the housing contains a first accommodation cavity; an electrode assembly, where the electrode assembly is accommodated in the first accommodation cavity; and a positive terminal and a negative terminal, where the positive terminal and the negative terminal are connected to the electrode assembly respectively. The failed battery cell contains a first through hole.

The first through hole is in communication with the first accommodation cavity. A conductive material configured to electrically connect the positive terminal and the negative terminal is injected into the first accommodation cavity through the first through hole.

When one or several battery cells fail in a working process of the battery module, a handling step is just to inject the conductive material into the failed battery cells, without a need to repair or replace the entire battery module. In addition, after the foregoing handling step is completed, just a few battery cells (that is, the failed battery cells) in the battery module do not participate in the formation of a circuit, and the battery module and the battery pack can still work normally without causing a significant decrease in a battery capacity of the battery module.

In a possible design, a second through hole is further disposed on the failed battery cell, and an area of the second through hole is smaller than that of the first through hole.

When a flux of the injected conductive material and a flux of the expelled electrolyte vapor are constant, the area of the second through hole for exhausting vapor is configured as small as possible, so as to reduce a possibility of leaking the electrolytic solution.

In a possible design, the failed battery cell includes a housing and a top cover plate connected with the housing. The first through hole is disposed on the housing, and a pressure plate overlays the housing.

In a possible design, the housing includes a first face. The first face is located at an end of the housing in a height direction. The top cover plate is located at an end of the first face along a width direction. The first through hole is disposed on the first face. Along the width direction, the first through hole is located between one-half of the first face and a projection of the top cover plate projected onto the first face.

In this way, the positive terminal can be electrically connected to the negative terminal by using a smaller amount of conductive material.

In a possible design, a projection of the positive terminal projected onto the first face is a first projection, and a projection of the negative terminal projected onto the first face is a second projection. The first through hole is located between an extension line of the first projection along the width direction and an extension line of the second projection along the width direction.

In this way, the conductive material flowing into the first accommodation cavity through the first through hole can be electrically connected to the positive terminal and the negative terminal quickly, thereby improving efficiency of repair.

In a possible design, the housing is made of a material including an aluminum alloy, and the conductive material includes tin, the aluminum alloy, or lead.

Compared with a housing made of plastic, the housing made of a metal material can more effectively avoid being melted by the conductive material that is in a molten state.

According to a third aspect, an embodiment of this application provides a battery pack. The battery pack includes: a box body, where the box body contains a second accommodation cavity; a battery module, where the battery module is accommodated in the second accommodation cavity, and the battery module is the battery module described above, where a positive terminal and a negative terminal are disposed along a length direction and oriented toward a side wall of the box body; and a pressure plate, disposed at an end of the battery module in a height direction, and the pressure plate is oriented toward a bottom wall of the box body.

With the battery pack according to this application, when one or several battery cells fail in a working process of the battery module, a handling step is just to inject the conductive material into the failed battery cells, without a need to repair or replace the entire battery module. Moreover, when the battery module is applied to a vehicle, the vehicle can be directly repaired at a 4S shop without returning the entire vehicle to the manufacturer or without replacing with a new battery pack, thereby improving working efficiency of the battery module, simplifying a maintenance process, and reducing maintenance cost.

In a possible design, a third through hole is opened at a position corresponding to each battery cell on the pressure plate. The position of the third through hole corresponds to the position of a first through hole.

With the third through hole being used as a reference hole, the hole is opened for the failed battery cell. A conductive material configured to electrically connect the positive terminal and the negative terminal is injected into the failed battery cell through the first through hole. In this way, the failed battery cell can be short-circuited without removing the pressure plate, thereby simplifying the maintenance process of the battery module.

In a possible design, a fourth through hole is opened at a position corresponding to each battery cell on the pressure plate. The position of the fourth through hole corresponds to the position of a second through hole.

With the fourth through hole being used as a reference, the second through hole is opened. Electrolyte vapor in the housing is expelled through the second through hole. This can prevent the electrolytic solution in the first accommodation cavity from leaking through the first through hole, thereby avoiding the failure of other battery cells and even occurrence of a fire of the vehicle.

According to a fourth aspect, an embodiment of this application provides a device. The device uses a battery cell as a power supply. The device includes: a power source configured to provide a driving force for battery pack; and a battery pack, where the battery pack is configured to provide electrical energy to the power source. The battery pack is the battery pack described above.

Therefore, in all the aspects described above, in the failed battery cell handling method according to this application, the conductive material that is configured to electrically connect the positive terminal and the negative terminal is injected into the failed battery cell. The conductive material is in the molten state when being injected and is in the solid state after cooling, so that the failed battery cell is short-circuited and other battery cells still work normally, without a need to replace the entire battery module. This simplifies a maintenance process of the battery module, reduces maintenance cost, and improves working efficiency (utilization rate) of the battery module.

REFERENCE NUMERALS

Figure 1:
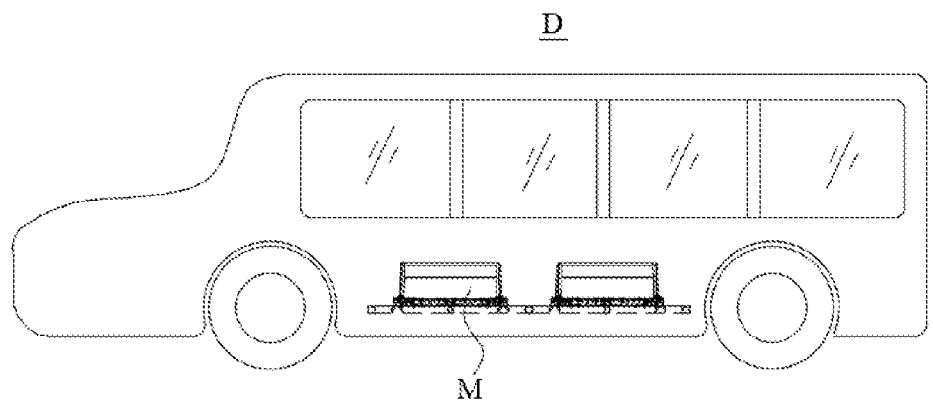
FIG. 1 is a schematic structural diagram of a device according to an embodiment of this application.

L—Length direction;
W—Width direction;
H: Height direction;
D—Device;
M—Battery pack;
M1—Box body;
M10—Upper box body;
M11—Lower box body;
M12—Second accommodation cavity;
M2—Battery module;
M21—Pressure plate;
M211—Third through hole;
M212—Fourth through hole;
M22—Cross beam;
1—Battery cell;
11—Failed battery cell;
110—Top cover plate;
111—Housing;
111a—First accommodation cavity;
111b—First face;
112—Electrode assembly;
112a—Positive electrode plate;
112b—Negative electrode plate;
112c—Separator;
112d—Positive tab;
112e—Negative tab;
112f—Current collecting plate;
113—Positive terminal;
114—Negative terminal;
115—First through hole;
116—Second through hole; and
12—Non-failed battery cell.

The drawings described here are incorporated into the specification as a part of the specification. The drawings illustrate embodiments of this application and are used together with the specification to interpret the principles of this application.

DETAILED DESCRIPTION OF EMBODIMENTS

The following describes this application in detail with reference to drawings and embodiments. Understandably, the specific embodiments described herein are merely intended to explain this application, but are not intended to limit this application.

In the description of the embodiments of this application, unless otherwise expressly specified and defined, the terms "first", "second", and "third" are for the sole purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in this application according to the context.

Understandably, in the description of this application, localizers such as "on", "above", "under", and "below" described in the embodiments of this application are described from a perspective shown in the drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

In related technologies, when a battery cell fails, the entire battery module is usually replaced as a solution. However, when a battery cell of the battery module fails, other battery cells still work normally. Directly replacing the entire battery module causes a waste of resources. In addition, it takes a long time to disassemble and assemble the battery module, which reduces working efficiency.

An embodiment of this application provides a device D that uses a battery cell 1 as a power supply. The device D that uses the battery cell 1 as a power supply may be a mobile device such as a vehicle, a ship, or a small aircraft. The device D contains a power source and a battery module M2. The power source is configured to provide a driving force for the device D. The battery module M2 is configured to provide electrical energy to the power source. The driving force of the device D may be sole electrical energy, or may include electrical energy and other types of energy (such as mechanical energy). The power source may be a battery module M2 (or a battery pack M), or may be a combination of a battery module M2 (or a battery pack M) and an engine, or the like. Therefore, all devices D that can use a battery cell 1 as a power supply fall within the protection scope of this application.

As shown in FIG. 1, using a vehicle as an example, a device D in an embodiment of this application may be a new energy vehicle. The new energy vehicle may be a battery electric vehicle, or may be a hybrid electric vehicle or a range-extended electric vehicle or the like. The vehicle may include a battery pack M and a vehicle body. The battery pack M is disposed in the vehicle body. A driving motor is further disposed in the vehicle body, and the driving motor is electrically connected to the battery pack M. The battery pack M provides electrical energy. The driving motor is connected to wheels of the vehicle body through a transmission mechanism to drive the vehicle to run. Specifically, the battery pack M may be horizontally disposed at a bottom of the vehicle body.

Figure 2:
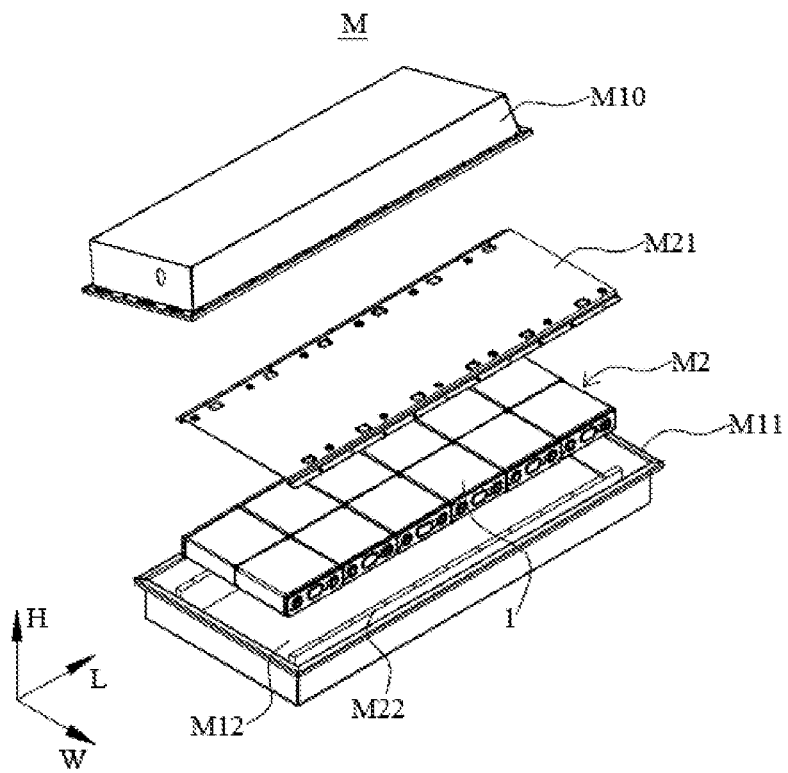
FIG. 2 is a schematic exploded view of a battery pack shown in FIG. 1.

As shown in FIG. 2, the battery pack M includes a box body M1 and a battery module M2. The box body M1 contains a second accommodation cavity M12. The battery module M2 is accommodated in the second accommodation cavity M12. The battery module M2 may be one or more in number. A plurality of battery modules M2 are arranged in the second accommodation cavity M12. The box body M1 is not limited in terms of type, and may be a frame shape, a disk shape, a box shape, or the like.

Figure 6:
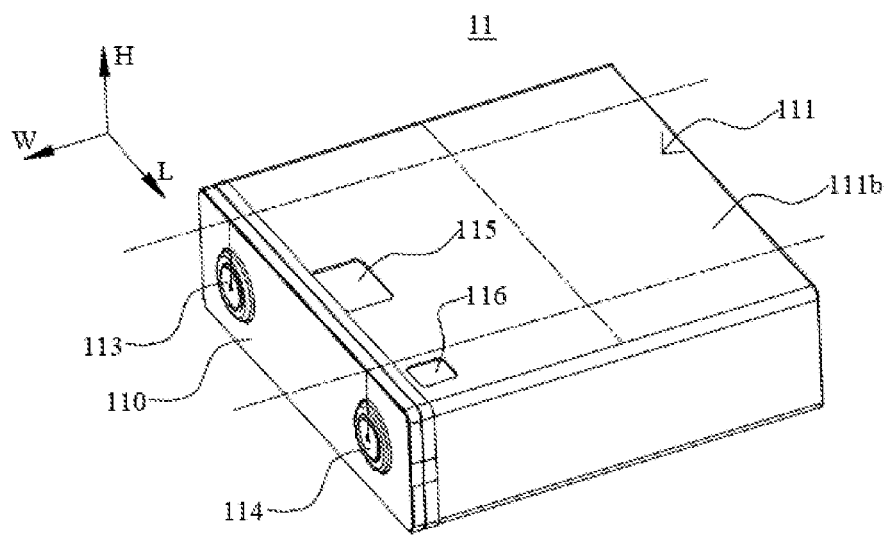
FIG. 6 is a schematic structural diagram of the failed battery cell shown in FIG. 4 and FIG. 5.

In addition, the battery module M2 includes a battery cell 1. A plurality of battery cells 1 are arranged sequentially in a length direction L. The battery cell 1 includes electrode terminals (including a positive terminal 113 and a negative terminal 114, as shown in FIG. 6). In the battery module M2, a plurality of battery cells 1 are electrically connected to each other to form a circuit of the battery module M2. Specifically, the battery cells 1 may be connected in series and/or in parallel or the like. For example, when the battery cells 1 are connected in series, the positive terminal 113 of one battery cell 1 is electrically connected to the negative terminal 114 of another battery cell 1.

In a possible design, the box body M1 may include a lower box body M11 configured to accommodate the battery module M2, and an upper box body M10 snap-fitted with the lower box body M11. That is, the second accommodation cavity M12 may be formed in the lower box body M11. Alternatively, the second accommodation cavity M12 may be formed between the upper box body M10 and the lower box body M11.

In a possible design, the second accommodation cavity M12 is formed in the lower box body M11. A cross beam M22 is further disposed at a bottom of the battery module M2. The battery module M2 is fixed in the lower box body M11 through the cross beam M22 by gluing, welding, riveting, or by other means. To ensure that the battery module M2 is more firmly fixed in the lower box body M11, the battery pack M further includes a pressure plate M21 fixed to the cross beam M22. In some embodiments, the cross beam M22 may be fixed to the pressure plate M21 by riveting.

During the working of the battery module M2, each battery cell 1 keeps being charged and discharged. In the charge and discharge process, the battery cell 1 is at risk of faults (such as thermal runaway). The faults make the battery cell 1 unable to work normally and failed, and form a failed battery cell 11. In this case, a circuit of the battery module M2 is faulty and unable to supply power normally. To solve this technical problem, this application removes the failed battery cell from the circuit by short-circuiting the failed battery cell 11, and forms a new circuit.

As shown in FIG. 2 to FIG. 5, a third through hole M211 is disposed at a position corresponding to each battery cell 1 (including the failed battery cell 11 and a non-failed battery cell 12) on the pressure plate M21 configured to overlay a plurality of battery cells 1. When one or several battery cells 1 in the battery module M2 are in a failed state, failed battery cells 11 are formed. A battery management system (BMS) (not shown in the drawing) electrically connected to the battery module M2 monitors status of each battery cell 11 in real time, so as to detect a specific position of the failed battery cell 11. Subsequently, a hole such as a first through hole 115 (see FIG. 6) is opened for the failed battery cell 11 by using the third through hole M211 corresponding to the failed battery cell 11 on the pressure plate M21 as a reference hole.

Figure 5:
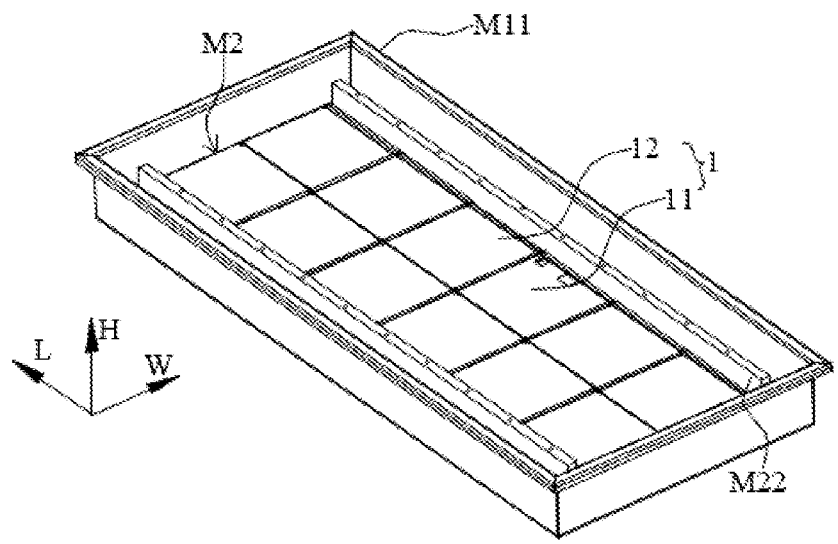
FIG. 5 is a schematic structural diagram of the battery pack shown in FIG. 4 after a pressure plate is removed.

In some embodiments, as shown in FIG. 5, for example, a hole may be opened for the failed battery cell 11 after the pressure plate M21 is removed (for example, the first through hole 115 is opened). A conductive material configured to electrically connect the positive terminal 113 and the negative terminal 114 is injected into the failed battery cell 11 through the first through hole 115.

Figure 3:
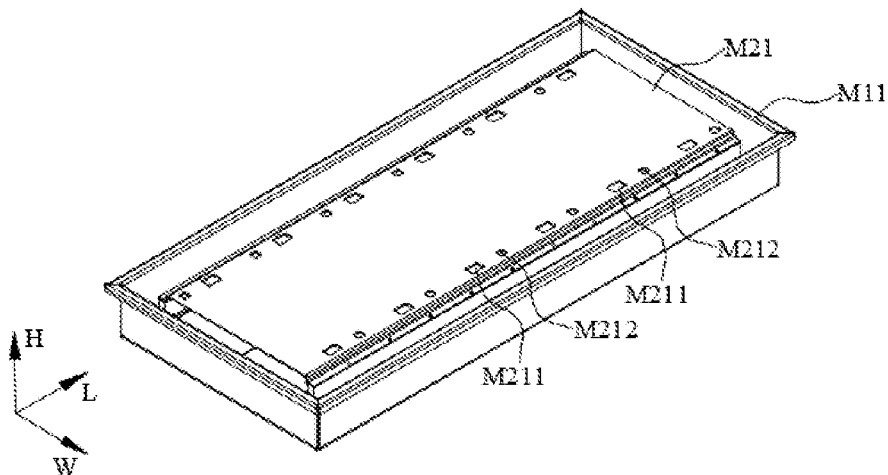
FIG. 3 is a schematic structural diagram of the battery pack shown in FIG. 2 after an upper box body is removed.
Figure 4:
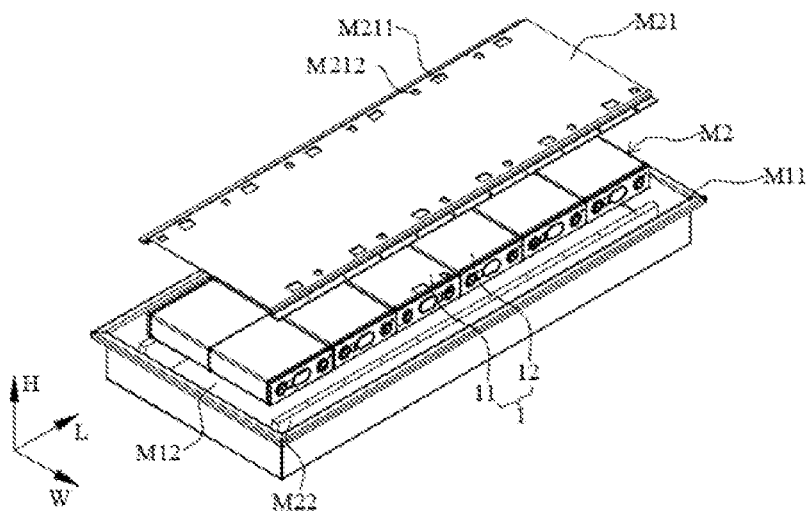
FIG. 4 is a schematic exploded view of the battery pack shown in FIG. 2 during or after repair of a failed battery cell.

In other embodiments, as shown in FIG. 4, for example, when the battery module M2 is in the state shown in FIG. 3, a hole such as the first through hole 115 is opened directly for the failed battery cell 11 by using the third through hole M211 as a reference hole without a need to remove the pressure plate M21. The conductive material configured to electrically connect the positive terminal 113 and the negative terminal 114 is injected into the failed battery cell 11 through the first through hole 115. In this way, the failed battery cell 11 can be short-circuited without removing the pressure plate M21, thereby simplifying the maintenance process of the battery module M2 (that is, saving the step of removing the pressure plate M21).

It needs to be noted that the conductive material is in a molten state when being injected, and is in a solid state after cooling. That is because the molten conductive material is easily injectable, and after cooling, the conductive material is electrically connected to the positive terminal 113 and the negative terminal 114. Therefore, the two implementation manners described above can make the failed battery cell 11 short-circuited, so as to simplify the maintenance process of the battery module M2, reduce the maintenance cost, and improve the working efficiency (utilization rate) of the battery module M2.

In the foregoing embodiment, the positive terminal 113 and the negative terminal 114 of the failed battery cell 11 are electrically connected, so that the failed battery cell 11 is short-circuited and no longer participates in the charge and discharge process of the battery module M2. That is, the failed battery cell 11 does not affect the circuit of the battery module M2. Therefore, when one or several battery cells 1 fail in a working process of the battery module M2, a handling step is just to inject the conductive material into the failed battery cells 11, without a need to repair or replace the entire battery module M2 (that is, the state shown in FIG. 4 or FIG. 5 can be maintained, and the battery module M2 is always accommodated in the second accommodation cavity M12). Moreover, when the battery module M2 is applied to a vehicle, the vehicle can be directly repaired at a 4S shop without returning the entire vehicle to the manufacturer or without replacing with a new battery pack M (that is, the state shown in FIG. 4 or FIG. 5 can be maintained, and the battery module M2 is always accommodated in the second accommodation cavity M12), thereby improving the working efficiency of the battery module M2, simplifying the maintenance process, and reducing the maintenance cost. In addition, after the foregoing handling step is completed, just a few battery cells 1 (that is, the failed battery cells 11) in the battery module M2 do not participate in the formation of the circuit, and the battery module M2 and the battery pack M can still work normally without causing a significant decrease in the battery capacity of the battery module M2.

In addition, in a structure in which the battery cell 1 is bonded into the second accommodation cavity M12 of the box body M1 by using a structural adhesive, when a battery cell 1 fails and a failed battery cell 11 is formed, it is not easy to perform an operation of removing the failed battery cell 11 from the second accommodation cavity M12. Therefore, in this embodiment, the handling manner is to inject the conductive material configured to electrically connect the positive terminal 113 and the negative terminal 114 into the failed battery cell 11 through the first through hole 115, and the handling manner possesses advantages of convenient operation and high efficiency.

Figure 7:
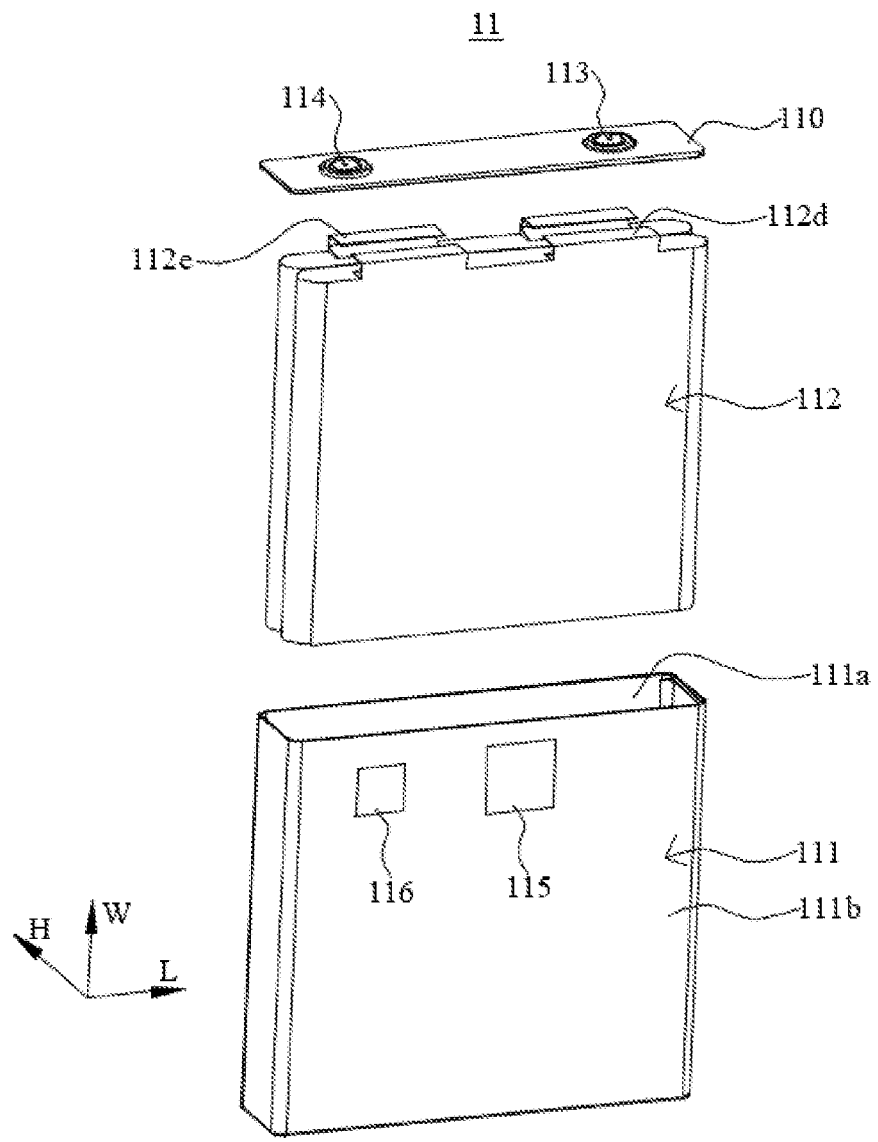
FIG. 7 is a schematic exploded view of the failed battery cell shown in FIG. 6 according to an embodiment.
Figure 8:
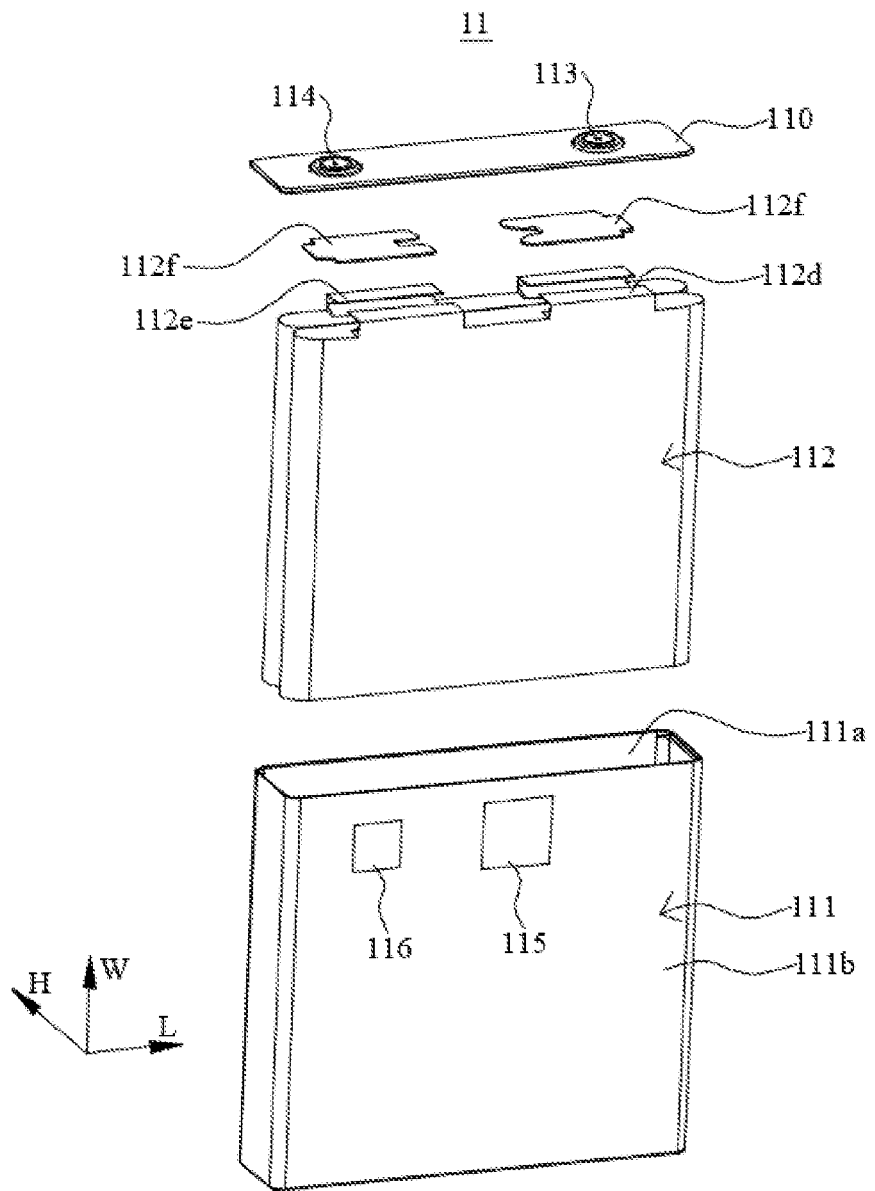
FIG. 8 is a schematic exploded view of the failed battery cell shown in FIG. 6 according to another embodiment.

It needs to be noted that, as shown in FIG. 6 to FIG. 8, the failed battery cell 11 further includes a housing 111 and an electrode assembly 112. The housing 111 contains a first accommodation cavity 111a. The electrode assembly 112 is accommodated in the first accommodation cavity 111a. The first through hole 115 is in communication with the first accommodation cavity 111a. The positive terminal 113 and the negative terminal 114 are electrically connected to the electrode assembly 112. In this way, the conductive material can be injected into the housing 111 to electrically connect the positive terminal 113 and the negative terminal 114. In other words, it is enough to ensure that the first through hole 115 is in communication with the first accommodation cavity 111a.

In a possible design, the first through hole 115 is disposed on the housing 111, so that a hole can be directly opened on the housing 111 to form the first through hole 115 through the third through hole M211 on the pressure plate M21. Alternatively, the first through hole 115 may be formed on the top cover plate 110 of the failed battery cell 11. The top cover plate 110 covers the first accommodation cavity 111a. The specific position of the first through hole 115 is not limited in this application. For example, a plurality of battery cells 1 provided in this embodiment of this application are mounted in a flat-lying manner (see FIG. 4). The flat-lying mounting manner may be understood as: the top cover plate 110 (or the positive terminal 113 and the negative terminal 114) is oriented toward a side wall of the lower box body M11 (or the box body M1). In this case, a major end face (such as a first face 111b) of the housing 111 is oriented toward a direction away from a bottom wall of the lower box body M11 (or the box body M1). In this way, opening a hole on the housing 111 is easier than opening a hole on the top cover plate 110. For another example, another arrangement manner of the battery cells 1 may be: the top cover plate 110 is oriented toward a direction away from the bottom wall of the lower box body M11, and the housing 111 is oriented toward the side wall of the lower box body M11. In this case, opening a hole on the top cover plate 110 is easier than opening a hole on the housing 111. For example, the hole may be formed by using an explosion-proof valve (not shown in the drawing) of the top cover plate 110.

It needs to be noted that the battery cell 1 mentioned in this embodiment of this application may be a pouch-type cell, or may be a prismatic cell or a cylindrical cell or the like. Correspondingly, the electrode terminals (including the positive terminal 113 and the negative terminal 114) of the battery cell 11 may be the electrode terminals of a pouch-type cell, or may be the electrode terminals of a prismatic cell or cylindrical cell.

Figures 9, 10:
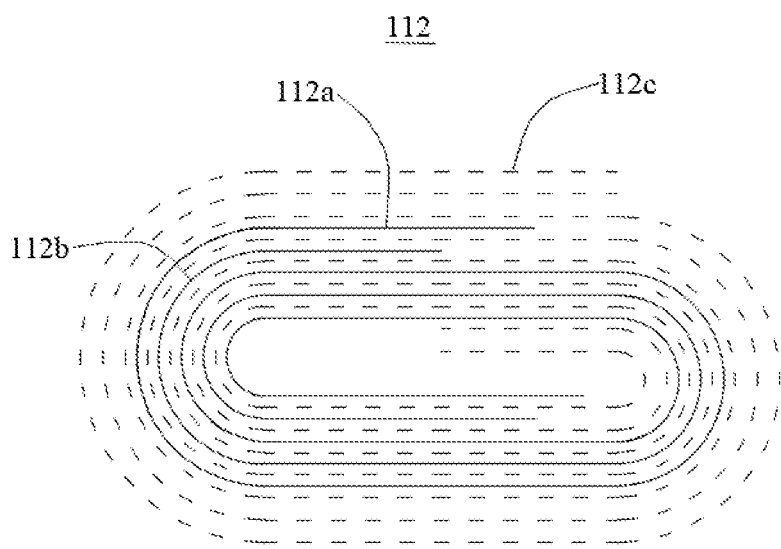
FIG. 9 is a schematic cross-sectional view of an electrode assembly shown in FIG. 7 or FIG. 8.
FIG. 10 is a flowchart of a failed battery cell handling method according to an embodiment of this application.

As shown in FIG. 7 and FIG. 9, the electrode assembly 112 includes a positive electrode plate 112a, a negative electrode plate 112b, and a separator 112c. The separator 112c is located between the positive electrode plate 112a and the negative electrode plate 112b that are adjacent, and is configured to separate the positive electrode plate 112a from the negative electrode plate 112b.

In a possible design, the positive electrode plate 112a, the separator 112c, and the negative electrode plate 112b are sequentially stacked and wound to form electrode units of the electrode assembly 112. That is, the electrode units of the electrode assembly 112 are a jelly-roll structure (see FIG. 9). A gap exists on the formed electrode units, and an electrolytic solution can enter the electrode units through the gap to infiltrate the positive electrode plate 112a and the negative electrode plate 112b. In addition, the positive terminal 113 and the negative terminal 114 are electrically connected to the positive electrode plate and the negative electrode plate respectively, and are formed on the top cover plate 110. The electrode assembly 112 and the electrolytic solution (not shown in the drawing) are accommodated together in the first accommodation cavity 111a. The electrolytic solution may be formed by mixing an organic solvent such as ethylene carbonate (EC), propylene carbonate (PC), dim-ethyl carbonate (DMC), ethyl methyl carbonate (EMC), and diethyl carbonate (DEC) with a lithium salt such as lithium hexafluorophosphate ($LiPF_6$) or lithium tetrafluoroborate ($LiBF_4$).

In a possible design, the positive electrode plate 112a includes a positive current collector (such as an aluminum foil) and a positive active material layer (such as a ternary material, lithium iron phosphate or lithium cobaltate) coated on a surface of the positive current collector. The negative electrode plate 112b includes a negative current collector (such as a copper foil) and a negative active material layer (such as carbon or silicon) coated on a surface of the negative current collector. The electrode assembly 112 further includes a positive tab 112d and a negative tab 112e. The positive tab 112d is connected to the positive electrode plate 112a, and extends from the electrode unit. The positive tab 112d may be directly cut out from the positive current collector. The negative tab 112e is connected to the negative electrode plate 112b, and extends from the electrode unit. The negative tab 112e may be directly cut out from the negative current collector.

In this embodiment, the conductive material may be connected to the positive tab 112d and the negative tab 112e after being cured, so as to implement electrical connection between the positive terminal 113 and the negative terminal 114.

As shown in FIG. 8, different from FIG. 7, the electrode assembly 112 in FIG. 8 further includes a current collecting plate 112f. The positive terminal 113 is electrically connected to the positive tab 112d through the current collecting plate 112f. The negative terminal 114 is electrically connected to the negative tab 112e through the current collecting plate 112f.

In this embodiment, the conductive material may be connected to the positive tab 112d (and/or the current collecting plate 112f connected thereto) and the negative tab 112e (and/or the current collecting plate 112f connected thereto) after being cured, so as to implement electrical connection between the positive terminal 113 and the negative terminal 114.

Still referring to FIG. 6, in a possible design, the housing 111 includes a first face 111b. The first face 111b is located at an end of the housing 111 in a height direction H. The top cover plate 110 is located at an end of the first face 111b along a width direction W. The first through hole 115 is disposed on the first face 111b. Along the width direction W, the first through hole 115 is located between one-half of the first face 111b (see the dotted line located on the first face 111b and extending in the length direction L in FIG. 6) and a projection of the top cover plate 110 projected onto the first face 111b (that is, an edge at which the top cover plate 110 intersects the first face 111b). In this way, the positive terminal 113 can be electrically connected to the negative terminal 114 by using a smaller amount of conductive material. Alternatively, the first through hole 115 may be disposed at any position on the housing 111 as long as the conductive material can be injected into the housing 111 to electrically connect the positive terminal 113 and the negative terminal 114.

In a possible design, the projection of the positive terminal 113 projected onto the first face 111b is a first projection, and the projection of the negative terminal 114 projected onto the first face 111b is a second projection. The first through hole 115 is located between an extension line of the first projection along the width direction W and an extension line of the second projection along the width direction W, as indicated by the dotted line located on the first face 111b and extending along the width direction W in FIG. 6. In this way, the conductive material flowing into the first accommodation cavity 111a through the first through hole 115 can be electrically connected to the positive terminal 113 and the negative terminal 114 quickly, thereby improving efficiency of repair.

In a possible design, the failed battery cell 11 further includes a second through hole 116 communicating with the first accommodation cavity 111a. The second through hole 116 is disposed on the first face 111b. In some aspects, after the high-temperature molten conductive material is injected into the first accommodation cavity 111a, the electrolytic solution can be evaporated by virtue of high-temperature characteristics of the conductive material. Electrolyte vapor may be expelled from the first accommodation cavity 111a through the second through hole 116. This can prevent the electrolytic solution in the first accommodation cavity 111a from leaking through the first through hole 115 and/or the second through hole 116, thereby avoiding the failure of other battery cells 1 and even occurrence of a fire of the vehicle. In other aspects, the electrolytic solution may be extracted from the first accommodation cavity 111a through the second through hole 116, thereby preventing the electrolytic solution from leaking through the first through hole 115 and/or the second through hole 116. In other aspects, a constant pressure between the first accommodation cavity 111a and the outside may be maintained through the second through hole 116. To be specific, without the second through hole 116, injecting the conductive material into the first accommodation cavity 111a through the first through hole 115 will increase the pressure in the first accommodation cavity 111a. This may cause the housing 111 to expand, and may further lead to leakage of the conductive material and/or electrolytic solution.

Alternatively, the electrolyte vapor may be expelled from the first accommodation cavity 111a through the first through hole 115, but this will affect the flux of the electrolytic solution injected. Likewise, the electrolytic solution may also be extracted from the first accommodation cavity 111a through the first through hole 115. However, this manner is not conducive to improving the repair efficiency because operation steps in this manner are more complicated than those in the manner in which the second through hole 116 is opened.

Understandably, a fourth through hole M212 corresponding to each battery cell 1 is further disposed on the pressure plate M21. When the BMS successfully detects the position of the failed battery cell 11, the first through hole 115 and the second through hole 116 may be opened on the housing 111 of the failed battery cell 11 with reference to the positions of the third through hole M211 and the fourth through hole M212 corresponding to the failed battery cell 11 on the pressure plate M21. The first through hole 115 and the third through hole M211 are opposite to each other and have an identical opening area, and the second through hole 116 and the fourth through hole M212 are opposite to each other and have an identical opening area.

In the process of opening the holes, the first through hole 115 and the second through hole 116 may be opened using a drilling technique such as direct dielectric drilling, laser drilling with conformal mask, and complete-hole formation. The drilling technique is not specifically limited in this application.

In a possible design, along the width direction W, the second through hole 116 is located between one-half of the first face 111b (see the dotted line located on the first face 111b and extending in the length direction L in FIG. 6) and a projection of the top cover plate 110 projected onto the first face 111b (that is, an edge at which the top cover plate 110 intersects the first face 111b). In this way, the electrolyte vapor generated by the heating of the electrolytic solution can be expelled more quickly out of the first accommodation cavity 111a. Alternatively, the second through hole 116 may be disposed at any position on the first face 111b as long as the second through hole serves at least a function of expelling the electrolyte vapor (for example, the second through hole may further serve functions of extracting the electrolytic solution and keeping a stable pressure in the first accommodation cavity 111a).

In a possible design, an area of the second through hole 116 is smaller than that of the first through hole 115. A spacing between gas molecules is greater than a spacing between liquid molecules and a spacing between solid molecules. This means that the spacing between gas molecules is greater than a spacing between molten molecules. Therefore, a gas molecule moves faster than a molten molecule. In view of this, when a flux of the injected conductive material and a flux of the expelled electrolyte vapor are constant, the area of the second through hole 116 for exhausting vapor can be configured as small as possible, so as to reduce a possibility of leaking the electrolytic solution.

In a possible design, the housing 111 is made of a metal material. Compared with the housing made of plastic, the housing 111 made of a metal material can more effectively avoid being melted by the molten conductive material. In addition, when the housing 111 is made of a metal material, to prevent the metal material from being melted by the molten conductive material, a melting point of the conductive material is lower than that of the metal material.

In a possible design, the metal material includes aluminum. For example, the metal material may be an aluminum-manganese alloy, and main ingredients of the alloy include Mn, Cu, Mg, Si, Fe, and the like. Among the ingredients, Cu and Mg can increase strength and rigidity, Mn can improve corrosion resistance, Si can enhance heat treatment effects of a magnesium-containing aluminum alloy, and Fe can increase high-temperature strength. The conductive materials include tin. That is because tin is a soft metal with a relatively low melting point and high plasticity. In addition, tin is more cost-effective than other metals whose melting point is lower than that of aluminum or an aluminum alloy. Therefore, a tin-containing metal material may be used as the conductive material. Alternatively, the metal material may be steel. However, an aluminum-containing material is lighter than stainless steel, and thereby can increase an energy density of a battery. The conductive material may be another metal with a melting point lower than that of aluminum, such as an aluminum alloy or lead.

In addition, as shown in FIG. 10, an embodiment of this application further provides a failed battery cell 11 handling method. The battery module M2 mentioned above is a specific implementation that adopts the handling method. The handling method includes the following step:

S1. Injecting a conductive material into a failed battery cell 11, where the conductive material is in a molten state when being injected, and is in a solid state after cooling.

The conductive material is in a molten state when being injected. The molten conductive material is easily injectable. After cooling, the conductive material is electrically connected to the positive terminal 113 and the negative terminal 114. The conductive material is configured to electrically connect the positive terminal 113 and the negative terminal 114 of the failed battery cell 11, so as to make the failed battery cell 11 short-circuited, simplify the maintenance process of the battery module M2, reduce the maintenance cost, and improve the working efficiency of the battery module M2. In addition, by means of the conductive material, the failed battery cell 11 is short-circuited and no longer participates in the charge and discharge process of the battery module M2. That is, the failed battery cell 11 does not affect the circuit of the battery module M2.

In a possible design, the conductive material is injected through an opening. For example, a first through hole 115 may be opened on the housing 111. For another example, a first through hole 115 may be opened on a top cover plate 110. It needs to be noted that a plurality of battery cells 1 provided in this embodiment of this application are mounted in a flat-lying manner (see FIG. 4). The flat-lying mounting manner may be understood as: the top cover plate 110 (or the positive terminal 113 and the negative terminal 114) is oriented toward a side wall of the lower box body M11 (or the box body M1). In this case, a major end face (such as a first face 111b) of the housing 111 is oriented toward a direction away from a bottom wall of the lower box body M11 (or the box body M1). In this way, opening a hole on the housing 111 is easier than opening a hole on the top cover plate 110. In addition, another arrangement manner of the battery cells 1 may be: the top cover plate 110 is oriented toward a direction away from the bottom wall of the lower box body M11, and the housing 111 is oriented toward the side wall of the lower box body M11. In this case, opening a hole on the top cover plate 110 is easier than opening a hole on the housing 111. For example, the hole may be formed by using an explosion-proof valve (not shown in the drawing) of the top cover plate 110.

In a possible design, the handling method further includes following step:

extracting an electrolytic solution from inside the failed battery cell 11 outward.

In this step, the electrolytic solution may be extracted outward from the first accommodation cavity 111a by using the first through hole 115, and then the conductive material is injected into the first accommodation cavity 111a through the first through hole 115. Further, a second through hole 116 may be opened on the housing 111, and the electrolytic solution may be extracted from the first accommodation cavity 111a through the second through hole 116, thereby preventing the electrolytic solution from leaking through the first through hole 115 and/or the second through hole 116. It needs to be noted that the electrolytic solution may be extracted in parallel with the injection of the conductive material. For example, when the conductive material is injected into the first accommodation cavity 111a through the first through hole 115, the electrolytic solution in the first accommodation cavity 116 is extracted outward through the second through hole 116 at the same time. For another example, the electrolytic solution may be extracted after the conductive material is injected. In other words, this application does not limit the order between the injection of the conductive material and the extraction of the electrolytic solution.

In some implementation solutions, it is more advantageous to extract the electrolytic solution from the failed battery cell 11 (or the first accommodation cavity 111a) outward before injecting the conductive material into the failed battery cell 11 (or the first accommodation cavity 111a). Because the injected conductive material has a specific temperature, the practice of extracting the electrolytic solution before injecting the conductive material ensures safety of the battery cell 1, and ensures strength of connection between the conductive material and an electrode assembly 112, so as to prevent a void from being generated in the conductive material due to evaporation of the electrolytic solution.

Understandably, the practice of extracting the electrolytic solution before injecting the conductive material may be performed in two ways: (1) the electrolytic solution is extracted outward from the first accommodation cavity 111a by using the first through hole 115, and then the conductive material is injected into the first accommodation cavity 111a through the first through hole 115; and (2) a second through hole 116 is opened on the housing 111, and the electrolytic solution is extracted from the first accommodation cavity 111a through the second through hole 116, and then the conductive material is injected into the first accommodation cavity 111a through the first through hole 115.

In a possible design, the failed battery cell 11 and the non-failed battery cell 12 are fixed in a lower box body M11 by a pressure plate M21, and the handling method further includes the following step:

injecting, after the pressure plate M21 is removed, the conductive material into the failed battery cell 11 through the first through hole 115 opened on the failed battery cell 11.

When one or several battery cells 1 in the battery module M2 are in a failed state, failed battery cells 11 are formed. A battery management system (battery management system, BMS) (not shown in the drawing) electrically connected to the battery module M2 monitors status of each battery cell 11 in real time, so as to detect a specific position of the failed battery cell 11. Subsequently, a hole such as a first through hole 115 (see FIG. 6) is opened for the failed battery cell 11 by using the third through hole M211 corresponding to the failed battery cell 11 on the pressure plate M21 as a reference hole.

In some embodiments, as shown in FIG. 5, for example, a hole may be opened for the failed battery cell 11 after the pressure plate M21 is removed. For example, the first through hole 115 is opened. The conductive material configured to electrically connect the positive terminal 113 and the negative terminal 114 is injected into the failed battery cell 11 through the first through hole 115. A method for opening a hole for the failed battery cell 11 may be making the hole by using an explosion-proof valve (not shown in the drawing) of the top cover plate 110.

Figure 11:
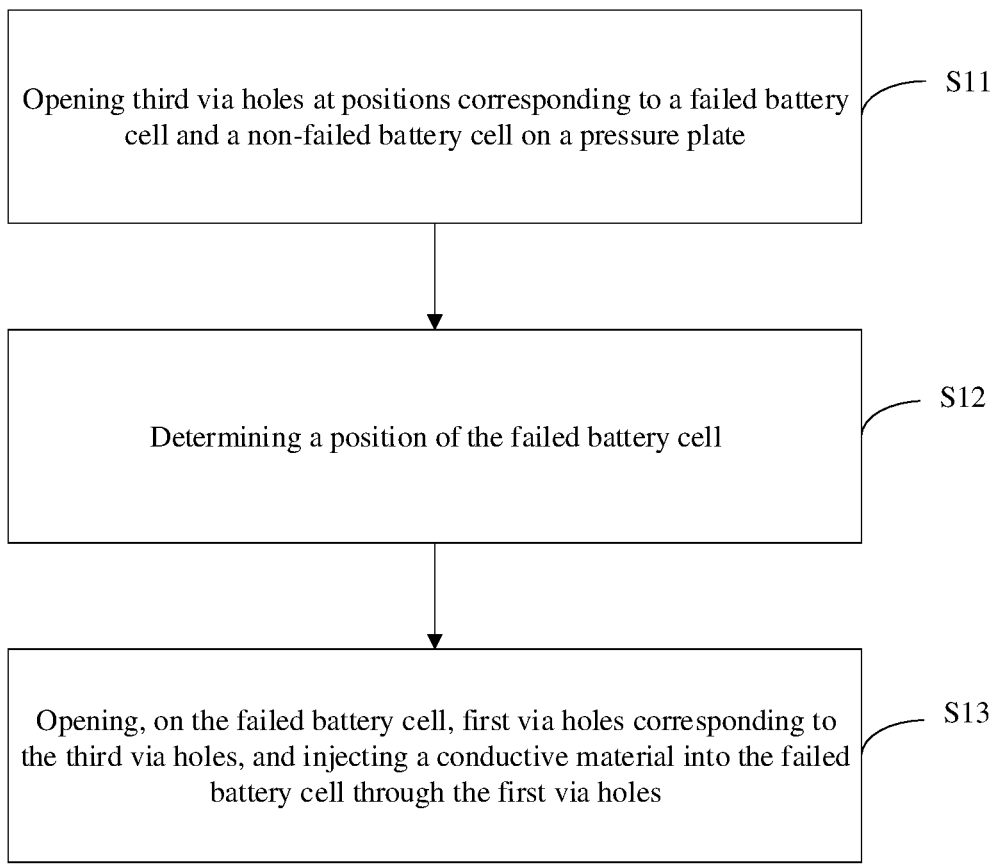
FIG. 11 is a flowchart of a failed battery cell handling method according to another embodiment of this application.

In a possible design, the failed battery cell 11 and the non-failed battery cell 12 are fixed in the lower box body M11 by the pressure plate M21. As shown in FIG. 11, another embodiment of this application provides another failed battery cell 11 handling method, further including the following steps.

S11. Opening third through holes M211 at positions corresponding to the failed battery cell 11 and the non-failed battery cell 12 on the pressure plate M21.

The third through hole M211 is opened in order to open a first through hole 115 subsequently on the housing 111 of the failed battery cell 11 at a determined position.

In a possible design, another embodiment of this application provides another failed battery cell 11 handling method, and step S11 in the handling method further includes the following step: opening fourth through holes M212 at positions corresponding to the failed battery cell 11 and the non-failed battery cell 12 on the pressure plate M21. The fourth through holes M212 are opened in order to open a second through hole 116 subsequently on the housing 111 of the failed battery cell 11 at a determined position.

S12. Determining the position of the failed battery cell 11.

A battery management system (BMS) electrically connected to the battery module M2 monitors status of each battery cell 11 in real time, so as to detect a specific position of the failed battery cell 11.

S13. Opening, on the housing 111 of the failed battery cell 11, first through holes 115 corresponding to the third through holes M211, and injecting the conductive material into the failed battery cell 11 through the first through holes 115.

For example, the first through holes 115 are opened by direct dielectric drilling, laser drilling with conformal mask, complete-hole formation or by other means. With the molten conductive material injected into the housing 11, the failed battery cell 11 is short-circuited, so that the failed battery cell 11 no longer participates in the charge and discharge process of the battery module M2. That is, the failed battery cell 11 does not affect the circuit of the battery module M2.

As shown in FIG. 4, for example, when the battery module M2 is in the state shown in FIG. 3, a hole such as the first through hole 115 is opened directly for the failed battery cell 11 by using the third through hole M211 as a reference hole without a need to remove the pressure plate M21. The conductive material configured to electrically connect the positive terminal 113 and the negative terminal 114 is injected into the failed battery cell 11 through the first through hole 115. In this way, the failed battery cell 11 can be short-circuited without removing the pressure plate M21, thereby simplifying the maintenance process of the battery module M2 (that is, saving the step of removing the pressure plate M21).

In a possible design, still another embodiment of this application provides another failed battery cell 11 handling method, and step S13 in the handling method further includes the following step: opening, on the housing 111 (for example, on the first face 111b of the housing 111) of the failed battery cell 11, second through holes 116 corresponding to the fourth through holes M212, so that the electrolyte vapor in the housing 111 is expelled through the second through holes 116. After the high-temperature molten conductive material is injected into the first accommodation cavity 111a, the electrolytic solution can be evaporated by virtue of high-temperature characteristics of the conductive material. Electrolyte vapor may be expelled from the first accommodation cavity 111a through the second through hole 116. This can prevent the electrolytic solution in the first accommodation cavity 111a from leaking through the first through hole 115, thereby avoiding the failure of other battery cells 1 and even occurrence of a fire of the vehicle.

In other aspects, the electrolytic solution may be extracted from the first accommodation cavity 111a through the second through hole 116, thereby preventing the electrolytic solution from leaking through the first through hole 115 and/or the second through hole 116. In other aspects, a constant pressure between the first accommodation cavity 111a and the outside may be maintained through the second through hole 116. To be specific, without the second through hole 116, injecting the conductive material into the first accommodation cavity 111a through the first through hole 115 will increase the pressure in the first accommodation cavity 111a. This may cause the housing 111 to expand, and may further lead to leakage of the conductive material and/or electrolytic solution.

Alternatively, the electrolyte vapor may be expelled from the first accommodation cavity 111a through the first through hole 115, but this will affect the flux of the electrolytic solution injected. Likewise, the electrolytic solution may also be extracted from the first accommodation cavity 111a through the first through hole 115. However, this manner is not conducive to improving the repair efficiency because operation steps in this manner are more complicated than those in the manner in which the second through hole 116 is opened.

In a possible design, the housing 111 includes a first face 111b (see FIG. 6). The first face 111b is located at an end of the housing 111 in a height direction H. The top cover plate 110 is located at an end of the first face 111b along a width direction W. The first through hole 115 is disposed on the first face 111b. Along the width direction W, the first through hole 115 is located between one-half of the first face 111b (see the dotted line located on the first face 111b and extending in the length direction L in FIG. 6) and a projection of the top cover plate 110 projected onto the first face 111b (that is, an edge at which the top cover plate 110 intersects the first face 111b). In this way, the positive terminal 113 can be electrically connected to the negative terminal 114 by using a smaller amount of conductive material. Alternatively, the first through hole 115 may be disposed at any position on the housing 111 as long as the conductive material can be injected into the housing 111 to electrically connect the positive terminal 113 and the negative terminal 114.

In a possible design, the projection of the positive terminal 113 projected onto the first face 111b is a first projection, and the projection of the negative terminal 114 projected onto the first face 111b is a second projection. The first through hole 115 is located between an extension line of the first projection along the width direction W and an extension line of the second projection along the width direction W, as indicated by the dotted line located on the first face 111b and extending along the width direction W in FIG. 6. In this way, the conductive material flowing into the first accommodation cavity 111a through the first through hole 115 can be electrically connected to the positive terminal 113 and the negative terminal 114 quickly, thereby improving efficiency of repair.

In conclusion, a failed battery cell 11 handling method is provided in an embodiment of this application. When one or several battery cells 1 fail in a working process of the battery module M2, the failure can be solved by just injecting the conductive material into the failed battery cells 11, without a need to repair or replace the entire battery module M2 (that is, the status shown in FIG. 5 is maintained, and just the pressure plate M21 needs to be removed). When the battery module M2 is applied to a vehicle, the vehicle can be directly repaired at a 4S shop without returning the entire vehicle to the manufacturer or without replacing with a new battery pack M (that is, the status shown in FIG. 5 is maintained, and just the pressure plate M21 needs to be removed), thereby improving working efficiency of the battery module M2, simplifying the maintenance process, and reducing the maintenance cost. In addition, after the foregoing handling step is completed, just a few battery cells 1 (that is, the failed battery cells 11) in the battery module M2 do not participate in the formation of the circuit, and the battery module M2 and the battery pack M can still work normally without causing a significant decrease in the battery capacity of the battery module M2.

The foregoing descriptions are merely exemplary embodiments of this application, but are not intended to limit this application. Any modifications, equivalent substitutions, and improvements made within the spirit and principles of this application fall within the protection scope of this application.

What is claimed is:

1. A failed battery cell handling method, wherein the handling method comprises the following step:
   injecting a conductive material into a failed battery cell, wherein the conductive material is in a molten state when being injected, and is in a solid state after cooling, wherein the conductive material is configured to electrically connect a positive terminal and a negative terminal of the failed battery cell.

2. The failed battery cell handling method according to claim 1, wherein the handling method further comprises the following step:
   extracting an electrolytic solution from inside the failed battery cell outward.

3. The failed battery cell handling method according to claim 1, wherein the failed battery cell and a non-failed battery cell are fixed in a lower box body by a pressure plate, and the handling method further comprises the following steps:
   determining a position of the failed battery cell; and
   injecting, after the pressure plate is removed, the conductive material into the failed battery cell through a first through hole opened on the failed battery cell.

4. The failed battery cell handling method according to claim 1, wherein the failed battery cell and a non-failed battery cell are fixed in a lower box body by a pressure plate, and the handling method further comprises the following steps:
   opening a second through hole at a position corresponding to each of the failed battery cell and each of the non-failed battery cell on the pressure plate;
   determining a position of the failed battery cell; and
   opening, on the failed battery cell, a first through hole corresponding to the second through hole, and injecting the conductive material into the failed battery cell through the first through hole.

5. The failed battery cell handling method according to claim 4, wherein the pressure plate overlays housings of the failed battery cell and the non-failed battery cell, and the handling method further comprises the following steps:
   opening a fourth through hole at a position corresponding to each of the failed battery cell and each of the non-failed battery cell on the pressure plate; and
   opening, on the housing of the failed battery cell, a third through hole corresponding to the fourth through hole.

6. A battery module, adopting the failed battery cell handling method according to claim 3, wherein the battery module comprises a battery cell, a plurality of battery cells are arranged sequentially in a length direction, the battery cells comprise the failed battery cell, and the failed battery cell comprises:
   a housing, wherein the housing contains a first accommodation cavity;
   an electrode assembly, wherein the electrode assembly is accommodated in the first accommodation cavity; and
   a positive terminal and a negative terminal, wherein the positive terminal and the negative terminal are connected to the electrode assembly respectively, wherein the failed battery cell contains the first through hole, the first through hole is in communication with the first accommodation cavity, and a conductive material configured to electrically connect the positive terminal and the negative terminal is injected into the first accommodation cavity through the first through hole.

7. The battery module according to claim 6, wherein a second through hole is further disposed on the failed battery cell, and an area of the second through hole is smaller than that of the first through hole.

8. The battery module according to claim 6, wherein the failed battery cell comprises a housing and a top cover plate connected with the housing, the first through hole is disposed on the housing, and a pressure plate overlays the housing.

9. The battery module according to claim 6, wherein the housing comprises a first face, the first face is located at an end of the housing in a height direction, the top cover plate is located at an end of the first face along a width direction, and the first through hole is disposed on the first face; and
   along the width direction, the first through hole is located between one-half of the first face and a projection of the top cover plate projected onto the first face.

10. The battery module according to claim 9, wherein a projection of the positive terminal projected onto the first face is a first projection, a projection of the negative terminal projected onto the first face is a second projection, and the first through hole is located between an extension line of the first projection along the width direction and an extension line of the second projection along the width direction.

11. The battery module according to claim 6, wherein the housing is made of a material comprising an aluminum alloy, and the conductive material comprises tin, the aluminum alloy, or lead.

12. A battery pack, wherein the battery pack comprises:
   a box body, wherein the box body contains a second accommodation cavity;
   a battery module, wherein the battery module is accommodated in the second accommodation cavity, and the battery module is the battery module according to claim 6, wherein
   a positive terminal and a negative terminal are disposed along a length direction and oriented toward a side wall of the box body; and
   a pressure plate, wherein the pressure plate is disposed at an end of the battery module in a height direction, and the pressure plate is oriented toward a bottom wall of the box body.

13. The battery pack according to claim 12, wherein a second through hole is opened at a position corresponding to each battery cell on the pressure plate, and the position of the second through hole corresponds to the position of a first through hole.

14. The battery pack according to claim 13, wherein a fourth through hole is opened at the position corresponding to each battery cell on the pressure plate, and the position of the fourth through hole corresponds to the position of a third through hole.

15. A device, wherein the device comprises:
   a power source, wherein the power source is configured to provide a driving force for the device; and
   a battery pack, wherein the battery pack is configured to provide electrical energy to the power source, and the battery pack is the battery pack according to claim 12.

* * * * *